United States Patent
Oakes et al.

(10) Patent No.: US 11,427,483 B2
(45) Date of Patent: Aug. 30, 2022

(54) ELECTRODE

(71) Applicant: JOHNSON MATTHEY PUBLIC LIMITED COMPANY, London (GB)

(72) Inventors: Daniel Charles Howard Oakes, Royston (GB); Christopher Mark Zalitis, Reading (GB)

(73) Assignee: Johnson Matthey Public Limited Company, London (GB)

( * ) Notice: Subject to any disclaimer, the term of this patent is extended or adjusted under 35 U.S.C. 154(b) by 425 days.

(21) Appl. No.: 16/312,507

(22) PCT Filed: Jun. 23, 2017

(86) PCT No.: PCT/GB2017/051835
§ 371 (c)(1),
(2) Date: Dec. 21, 2018

(87) PCT Pub. No.: WO2018/002588
PCT Pub. Date: Jan. 4, 2018

(65) Prior Publication Data
US 2019/0177188 A1    Jun. 13, 2019

(30) Foreign Application Priority Data
Jun. 29, 2016 (GB) .................................... 1611252

(51) Int. Cl.
*C02F 1/461* (2006.01)
*C25B 11/091* (2021.01)
(Continued)

(52) U.S. Cl.
CPC ........ *C02F 1/46109* (2013.01); *C02F 1/4674* (2013.01); *C25B 1/26* (2013.01);
(Continued)

(58) Field of Classification Search
CPC ......... C25B 1/04–1/144; C25B 11/00–11/097; C25B 11/04; C02F 1/46109–2001/46171
See application file for complete search history.

(56) References Cited

U.S. PATENT DOCUMENTS 4,105,530 A * 8/1978 Johnson .................. C23D 5/00
427/453
4,243,503 A    1/1981 Lieb

FOREIGN PATENT DOCUMENTS

DE    1964999 A1    7/1971
GB    1249300 A1    10/1971
(Continued)

OTHER PUBLICATIONS

Yin et al ("Transition-metal-doped Fe2O3 nanoparticles for oxygen evolution reaction", Progress in Natural Science: Materials International, 28, 4, 2018, pp. 430-436) for claim 8. (Year: 2018).*
(Continued)

*Primary Examiner* — Alexander W Keeling
(74) *Attorney, Agent, or Firm* — BakerHostetler (57) ABSTRACT

An electrode for an electrochemical cell is presented which comprises a substrate and an electrode material. The electrode material comprises an electrocatalyst and a solid glass phase which binds the electrocatalyst to the substrate. The electrodes of the invention are durable and can be produced by a much simpler, faster technique than is required for preparing conventional electrodes and can incorporate a wider range of electrocatalytic materials.

17 Claims, 3 Drawing Sheets

(51) Int. Cl.
*C02F 1/467* (2006.01)
*C25B 1/26* (2006.01)

(52) U.S. Cl.
CPC .. *C25B 11/091* (2021.01); *C02F 2001/46142* (2013.01); *C02F 2001/46161* (2013.01); *C02F 2303/04* (2013.01)

(56) References Cited

FOREIGN PATENT DOCUMENTS

| GB | 1346369 | A | 2/1974 |
| JP | S4834313 | B1 | 10/1973 |
| JP | S55139762 | A | 10/1980 |
| JP | S63267568 | A1 | 11/1988 |

OTHER PUBLICATIONS

The Engineering Toolbox ("Coefficients of Linear Thermal Expansion: Linear temperature expansion coefficients for aluminum, copper, glass, iron and other common materials", 2006 (Year: 2006).*

Li et al ("Glass frits coated with silver nanoparticles for silicon solar cells", Applied Surface Science, vol. 341, 2015, pp. 127-133) (Year: 2015).*

Adachi et al ("Effect of Glass Frits Amount on Atmospheric Sintering Behavior and Characteristics of Electrode Produced by Copper-Phosphorus Alloy", IEEE Journal of Photovoltaics, vol. 5, No. 5, 2015, pp. 1325-1334) (Year: 2015).*

Song et al ("Effect of glass frit addition on corrosion resistance of Ti/TiO2/Ir02—RuO2 films", Materials Letters, 58, 2004, pp. 817-823) (Year: 2004).*

Chandler et al., Electrodes based on noble metals, Platinum Metals Rev., 1997, 41 (2), pp. 54-63.

Song et al., Effect of glass frit addition on corrosion resistance of Ti/TiO2/IrO2—Ru02 films, Materials Letters 58 (2004), pp. 817-823.

S.Trasattl, Electrocatalysis: understanding the success of DSA, Electrochimica Acta 45 (2000), p. 2377-2385.

PCT/GB2017/051835, International Search Report dated Oct. 6, 2017.

PCT/GB2017/051835, Written Opinion dated Oct. 6, 2017.

* cited by examiner

ELECTRODE

CROSS-REFERENCE TO RELATED APPLICATIONS

This application is the National Stage of International Patent Application No. PCT/GB2017/051835 (filed Jun. 23, 2017), which claims priority from Great Britain Patent Application No. 1611252.6 (filed Jun. 29, 2016), the disclosures of each of which are incorporated herein by reference in their entireties for any and all purposes.

FIELD OF THE INVENTION

The present invention relates to electrodes for electrochemical cells which are particularly useful in electrolytic reactions, e.g. in electrochlorination for the disinfection of water. The present invention also provides methods for making electrodes and electrochemical cells, and the uses of electrodes and electrochemical cells.

BACKGROUND OF THE INVENTION

Electrochemical water treatment is an effective means for disinfecting water. Applications include the disinfection of drinking water, swimming pool water and industrial cooling water.

In electrochemical water treatment, electrodes (at least one anode and one cathode) are contacted with the water to be treated. A DC current is applied between the two electrodes, leading to the electrolysis of the water. In water with low concentrations of dissolved ions or other impurities, the main current-consuming electrochemical reactions are as follows.

At the anode, the main product is oxygen:

accompanied by the acidification of water in the vicinity of the anode.

At the cathode, hydrogen is formed:

and the water near the cathode becomes alkaline.

If the electrochemical treatment is applied to water containing chloride ions, a disinfection treatment is brought about by the electrochemical production of hypochlorite and/or hypochlorous acid from the chloride content of the water. The disinfectant hypochlorous acid/hypochlorite is produced at the anode in a side reaction to the oxygen evolution reaction described above. The sum of the concentrations of hypochlorous acid (HClO) and hypochlorite ion (ClO$^-$) in electrochemical systems designed to disinfect water in this manner is known as "free chlorine". The process is referred to as electrochlorination.

The anode used in electrochlorination processes is conventionally a DSA® (Dimensionally Stable Anode). DSAs are typically prepared by repeatedly spraying or painting a substrate with a solution containing precursors for the electrocatalyst material, followed by thermal decomposition in air to form the desired oxide electrocatalyst. For example, for preparing ruthenium dioxide electrodes, a solution of ruthenium chloride is applied to the surface of a substrate (e.g. a titanium substrate), followed by thermal decomposition in air to form ruthenium dioxide. The steps of applying the solution then thermally decomposing are repeated many times in order to build up a sufficiently thick layer on the substrate. Thus the formation of DSAs is time-consuming. The process for making DSAs is also inconvenient due to the need for strong acids to bind the coating to the substrate by reaction-dissolution. In addition, due to the method of preparation, DSAs are limited to catalytic materials in the form of salts. DSAs are discussed in Reference 1 and Reference 2.

Commercial DSAs are typically a mixture of ruthenium, iridium and titanium, and/or other valve metal, oxides. The active coating is laid down onto a substrate such as titanium metal. Typically, as many as forty repetitions of the metal salt application and thermal decomposition steps are required to produce the electrode.

SUMMARY OF THE INVENTION

The present inventors have surprisingly found that active, durable electrodes for electrochemical reactions such as electrochlorination can be provided by a much simpler, faster technique than is required for preparing conventional DSAs. This is achieved by applying an electrode formulation comprising electrocatalyst and glass frit to a substrate and firing the electrode formulation to cause the glass frit to coalesce. This methodology also allows the formation of electrodes comprising a wider range of catalyst materials than is achievable with DSA formation. The desired loading of electrocatalyst can be achieved by applying one or more layers of electrode formulation to the substrate, but only a single firing step is needed in order to achieve desirable levels of electrochemical activity and durability, as illustrated in the Examples below. Accordingly, the present invention provides an electrode for an electrochemical cell, and a method of making such an electrode.

Reference 3 describes dip-coated IrO$_2$—RuO$_2$ films containing up to 5 wt % of a lead borosilicate frit. The coating was formed by dip-coating a Ti/TiO$_2$ substrate, drying for 15 to 25 minutes at temperatures from 150-190° C., then annealing for 10 to 20 minutes at temperatures from 550-750° C. The dipping and annealing process was repeated to obtain the desired film thickness.

The present inventors have found that even where a higher amount of glass frit is used than that employed in Reference 3, and at an amount which forms a solid glass phase to bind the electrocatalyst to the substrate, surprisingly a highly durable electrode which is electrochemically active can be provided, and can be made by a simpler process.

Accordingly, at a general level, the present invention provides an electrode for an electrochemical cell, the electrode comprising electrode material disposed on a substrate, wherein the electrode material comprises electrocatalyst and glass. In a first preferred aspect, the present invention provides an electrode for an electrochemical cell, the electrode comprising electrode material disposed on a substrate, wherein the electrode material comprises electrocatalyst and a solid glass phase which binds the electrocatalyst to the substrate. Typically, the glass constitutes at least 10 wt % of the electrode material, such as at least 15 wt %. Typically, the glass is a silicate or borosilicate glass. Typically, the electrocatalyst forms an interconnected network of electrocatalyst through the electrode material. This provides an electrically conductive path from the electrolyte to the substrate in normal use of the electrode. Preferably, the glass is substantially free of lead.

Typically, the electrode is an anode, and the electrode material is an anode material. In this case, the electrochemical cell typically further comprises a cathode. Alternatively, the electrode is a cathode, and the electrode material is a cathode material. Typically, the electrochemical cell is an electrolytic cell, e.g. useful for electrochlorination. The present invention also provides an electrochemical cell comprising an electrode according to the first aspect.

In a second preferred aspect, the present invention provides a method of making an electrode for an electrochemical cell comprising applying an electrode (e.g. anode) formulation comprising electrocatalyst and glass frit to a substrate and firing the electrode formulation to cause the glass frit to coalesce. In this way, electrode (e.g. anode) material comprising an interconnected network of electrocatalyst and a solid glass phase which binds the electrocatalyst to the substrate is formed. Typically, the glass constitutes at least 10 wt % of the electrode material, such as at least 15%. The present invention further comprises a method of making an electrochemical cell comprising a method of making an electrode according to the second aspect.

In a third preferred aspect, the present invention provides use of an electrochemical cell comprising an electrode according to the first aspect in an electrochemical reaction, e.g. in an aqueous electrochemical reaction. In a fourth preferred aspect, the present invention provides use of an electrochemical cell comprising an electrode according to the first aspect for the disinfection of water. The electrochemical cell may be an electrolytic cell, e.g. an electrochlorination cell, and the water may be disinfected by electrochlorination.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

The electrode material of the present invention comprises glass and electrocatalyst. The glass typically forms a solid glass phase which binds the electrocatalyst to the substrate. The solid glass phase typically surrounds at least a portion of the electrocatalyst in order to bind it to the substrate. For example, the solid glass phase may be a substantially continuous phase (analogous to the continuous phase of an emulsion). However, the present inventors believe that it is important that the electrocatalyst is not fully encapsulated in the glass. In other words, typically the electrode material of the present invention comprises exposed electrocatalyst. The term "exposed electrocatalyst" is intended to include electrocatalyst which is not fully encapsulated in the glass. It may, for example, be on the electrolyte-side surface of the electrode material and/or in pores of the electrode material, if pores are present. The term "electrolyte-side surface" is intended to refer to the outer surface of the electrode material which is exposed to electrolyte during normal use of the electrode in an electrochemical cell.

The electrode material containing electrocatalyst and glass may be porous or may be substantially free of pores. In some embodiments, it may be preferred that the electrode material is substantially free of pores. As the skilled person will understand, small gaps or pores may exist within the bulk of the solid glass phase, which may occur for example if the glass frit has not completely coalesced during the firing step.

Figure 5:
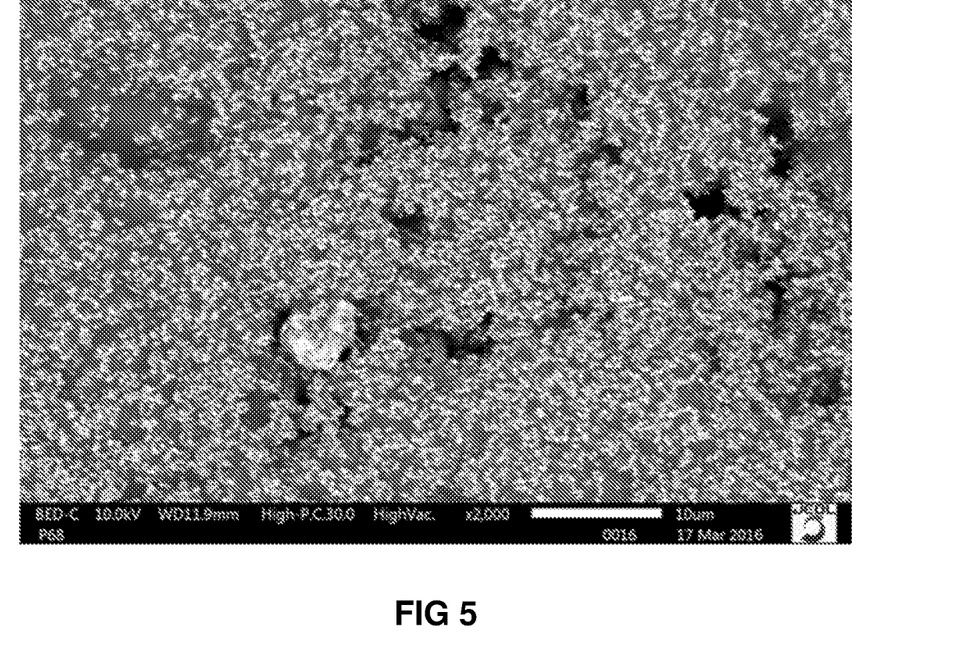
FIG. 5 shows a backscattered SEM micrograph of an electrode of Example 24.

Typically, the solid glass phase is formed by heating a glass frit on the substrate in order to cause it to coalesce and bind the electrocatalyst to the substrate. The present inventors consider that it is advantageous that during the heat treatment step, the glass does not fully wet the surface of the electrocatalyst. This ensures that the electrode material includes exposed electrocatalyst. Furthermore, incomplete wetting is believed to lead to the material having pits or pores on its exposed (electrolyte-side) surface. This can increase the surface area of exposed electrocatalyst which may enhance activity compared with a smoother surface. Pores/pits on the exposed surface of an electrode can be seen using SEM, for example as seen in FIG. 5.

As the skilled person will understand, the glass typically contacts the electrocatalyst in order for it to effectively bind the electrocatalyst to the substrate. However, where the glass has not fully wetted the surface of the electrocatalyst during heating, there may be regions (at a surface of the electrode material or within the electrode material) where the glass is spaced from the electrocatalyst. It is preferred that the electrode material forms a layer on the substrate. It is preferred that the layer of electrode material (e.g. continuous layer of electrode material) forms a barrier to prevent direct contact between the substrate and the electrolyte in normal use of the electrode in an electrochemical cell.

In the firing step(s) of the present invention, typically the glass is heated to a temperature slightly in excess of the temperature at which the glass starts to transition from sintering to macroscopic flow, such as to a temperature slightly in excess of the temperature at which it begins to exhibit macroscopic flow. At such temperatures, the molten glass is highly viscous and flows slowly. Without wishing to be bound by theory, the present inventors believe that in this slow-flowing, viscous state, the molten glass does not fully wet the surface of the electrocatalyst.

In the process of the present invention, typically, the firing is carried out at a suitable temperature and for a suitable length of time to allow the glass frit to coalesce to form a solid glass phase, but without fully encapsulating the electrocatalyst. This will vary depending on the melting behaviour of the glass used. Typically, the glass is heated to a temperature slightly in excess of the temperature at which the glass begins to transition from sintering to macroscopic flow, such as to a temperature slightly in excess of the temperature at which it begins to exhibit macroscopic flow. The skilled person is readily able to observe, e.g. using a hot stage microscope experiment, the temperature at which a glass begins to sinter, the transition from sintering to macroscopic flow and the temperature at which a glass begins to exhibit macroscopic glass flow. The temperature at which a glass begins to exhibit macroscopic glass flow is the lowest temperature at which the glass becomes molten and begins to flow.

Figure 1:
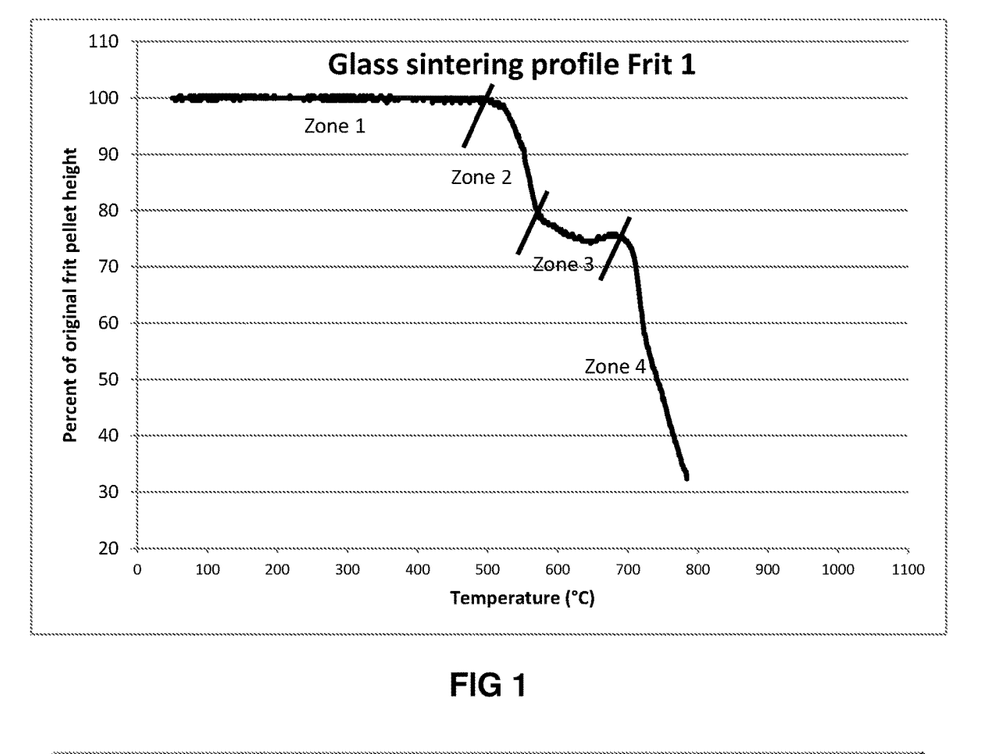
FIG. 1 shows a profile of the behaviour of Frit 1 on heating, taken from a hot stage microscope experiment, as reported in the Examples.
Figure 2:
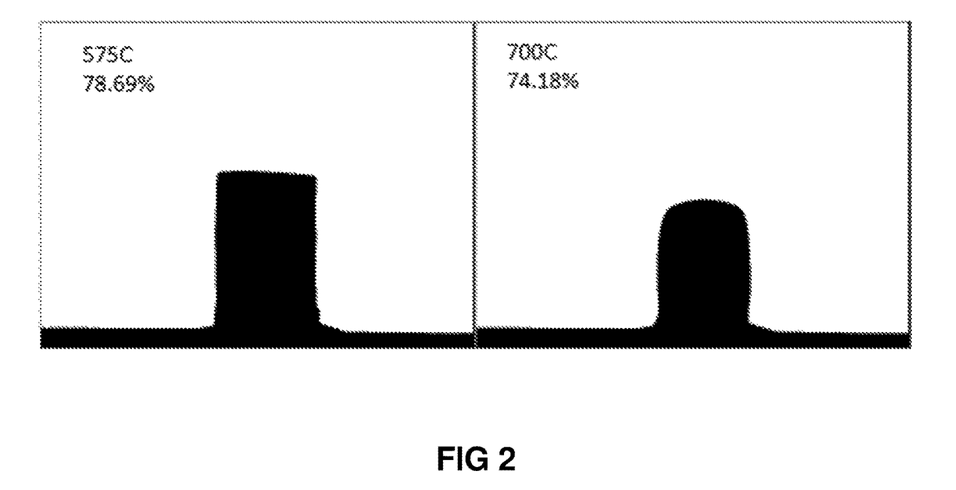
FIG. 2 shows images from the hot stage microscope experiment on Frit 1 as reported in the Examples.

The temperature at which the glass begins to exhibit macroscopic glass flow can be observed using a hot stage microscope experiment, e.g. where a pellet of glass frit is gradually heated to observe its melt behaviour on heating. An example plot from such an experiment is shown in FIG. 1 (for Frit 1 employed in the Examples below). The heating profile may be divided into four zones as shown on FIG. 1. In Zone 1 no change in dimension is observed as the pellet is heated. In Zone 2, the glass begins sintering and so the height of the pellet of glass frit is reduced. Zone 3 is the transition from sintering to macroscopic flow. At the start of Zone 4, the glass begins to exhibit macroscopic flow. FIG. 2 shows an image of the pellet at the end of sintering and a second image, on the right hand side, at the onset of macroscopic glass flow. Where macroscopic flow is occurring, the corners of the pellet become rounded. A pool of molten glass may begin to form at the base of the pellet as macroscopic flow progresses.

Typically, the firing of the electrode is carried out at a temperature of not more than 120° C. in excess of the temperature at which the glass begins to exhibit macroscopic glass flow. It may be carried out at a temperature of not more than 100° C. in excess of the temperature at which the glass begins to exhibit macroscopic glass flow, or not more than 75° C. in excess of the temperature at which the glass begins to exhibit macroscopic glass flow. Typically, it may be carried out at a temperature greater than the temperature which is 200° C. below the temperature at which the glass begins to exhibit macroscopic glass flow, such as a temperature greater than the temperature which is 25° C. below the temperature at which the glass begins to exhibit macroscopic glass flow, or at a temperature greater than the temperature at which the glass begins to exhibit macroscopic glass flow.

For example, for certain glasses the heating may be carried out at a temperature in a range from about 600° C. to about 830° C. For example, the firing temperature may be at least 600, 650, 680 or 700° C. It may be 850° C. or less, 820° C. or less, 800° C. or less or 780° C. or less. However, as the skilled person will understand, the temperature selected will depend on the melt properties of the glass frit.

The temperatures given here for the firing step are the temperature that the glass reaches during the firing step.

It is envisaged that higher temperatures could be employed, e.g. up to 300° C. or 400° C. in excess of the temperature at which the glass begins to exhibit macroscopic glass flow, for example if the heating time is very short (e.g. 1 minute or less, e.g. 30 s or less) and/or if the firing step is carried out in an inert atmosphere. Where heating times are very short, the present inventors consider that the glass may coalesce to form a solid glass phase without fully encapsulating the electrocatalyst.

The firing step is typically carried out in air. However, it may be preferable to carry out the firing step in an atmosphere which has a reduced capacity to oxidise the substrate, for example an atmosphere comprising less than 10 vol % of oxygen in nitrogen or argon. Alternatively, it may be carried out in a non-oxidising atmosphere, e.g. in an inert atmosphere. This may be particularly preferred where the firing temperature exceeds 800° C.

The firing step typically lasts from about 2 minutes to about 10 hours. It may be at least 2 minutes, at least 5 minutes, or at least 10 minutes. It may be 10 hours or less, 8 hours or less, 5 hours or less, 3 hours or less, 2 hours or less, or 1 hour or less. Where there is more glass present, typically a longer firing time is needed. For example, where there is 30 wt % of glass or more, the firing time may be at least 10 minutes, at least 15 minutes or at least 20 minutes.

As discussed herein, in contrast to the conventional method for the manufacture of DSAs, it is not necessary to fire the electrode in between the application of each layer of electrode material. Accordingly, it may be preferred that the method includes 3 or fewer, or 2 or fewer firing steps. In preferred embodiments, the method for the manufacture of the electrode includes a single firing step. Where more than one firing step is included, the preferred features of the firing step discussed herein apply independently to each step.

A high temperature and/or long heating time may significantly increase the formation of oxide on the surface of the substrate, which significantly increases the resistance of the contact between the electrode material and the substrate, adversely affecting electrode performance. This could be avoided by performing the heating step in an atmosphere with a reduced capacity to oxidise the substrate, for example an atmosphere comprising less than 10 vol % of oxygen in nitrogen or argon, or in a non-oxidising atmosphere, e.g. in an inert atmosphere.

Where the firing temperature is too low, the glass frit does not coalesce sufficiently, therefore providing insufficient cohesion and adhesion to the substrate. The layer of electrode material in these circumstances is typically highly porous. Such an insufficiently coalesced layer of electrode material permits the electrolyte to contact the substrate in use, which can lead to corrosion of the substrate and/or anodising of the substrate which increases resistance. Both of these factors may have a detrimental effect on the durability and activity of the electrode. Therefore, it is preferred that the electrode material forms a barrier on the surface of the substrate, thereby preventing contact between the electrolyte and the substrate in normal use of the electrode in an electrochemical cell.

In some embodiments, the electrode may be obtained or obtainable by a process described or defined herein. Specifically, the electrode may be obtained or obtainable by firing an electrode formulation comprising electrocatalyst and glass frit (and optionally liquid medium). Typically, the firing is carried out as described or defined herein.

Typically, the electrode is in the form of a layer or coating of electrode material on the surface of a substrate. Typically, the thickness of the electrode material is in the range from 1 μm to 100 μm. For example, the layer of electrode material may have a thickness of at least 1, 2, 5 or 10 μm. It may have a thickness of 200 μm or less, 150 μm or less, 100 μm or less, 700 μm or less, or 50 μm or less. Typically, the layer is of sufficient thickness to form a barrier on the surface of the substrate, thereby preventing contact between the electrolyte and the substrate in normal use of the electrode in an electrochemical cell.

The loading of glass on the electrode is typically at least 0.2 mg/cm$^2$. It may be at least 0.3, 0.5, 0.6, 0.8, 1, 2 or 3 mg/cm$^2$. There is no particular upper limit on the glass loading, but it may be 20 mg/cm$^2$ or less, e.g. 15 mg/cm$^2$ or less, 10 mg/cm$^2$ or less, 6 mg/cm$^2$ or less or 5 mg/cm$^2$ or less. The loading of glass may be calculated from the electrocatalyst loading with reference to the ratio of glass to electrocatalyst applied to the substrate.

The nature of the substrate is not particularly limited in the present invention. It is electrically conductive. It may include an oxide coating on a surface thereof, which may be electrically conductive. In some embodiments, it may be preferred that it does not include an oxide layer, e.g. does not include an intentionally added oxide layer and/or includes only a native oxide layer. In other cases, it may be preferred to include a preformed oxide layer such as a thermally grown or deposited oxide layer. Any intentionally added oxide layer may be electrically conductive. The substrate is typically a metal. The substrate is typically not readily corroded in the conditions employed in the electrochemical cell, e.g. in the presence of aqueous NaCl. Preferably, the substrate is titanium. Other suitable substrate materials include stainless steel, zirconium, niobium and tantalum.

The nature of the electrocatalyst is not particularly limited in the present invention. Typically, it is electrically conductive. Typically, it is active as one or more of an oxygen evolution reaction (OER) catalyst, an oxygen reduction reaction (ORR) catalyst, a hydrogen evolution reaction (HER) catalyst and other electrolysis catalyst such as an electrochlorination catalyst (which could be considered to be a chlorine evolution catalyst (CER)). The electrocatalyst may typically be a metal oxide (e.g. a single metal oxide or a mixed metal oxide). For example, the electrocatalyst may comprise oxides of one or more of the platinum group metals, e.g. may comprise one or more selected from the group consisting of oxides of ruthenium, iridium, palladium and platinum. Other suitable materials include platinum group metals (e.g. metal powders) and tin oxide. The electrocatalyst may be doped with one or more further components, such as a metal or metal oxide. The electrocatalyst may comprise a mixture of two or more different electrocatalysts.

For electrochlorination, particularly suitable anode catalysts include iridium metal, iridium oxide, palladium metal, ruthenium metal and ruthenium oxide and mixtures thereof (including mixed oxides). For electrochlorination, particularly suitable cathode materials include platinum metal, ruthenium metal, rhodium metal, iridium metal and palladium metal and mixtures thereof.

Typically, the electrocatalyst is provided in the electrode formulation as a preformed catalyst, e.g. particles of electrocatalyst material. This is in contrast to conventional DSA-type electrodes where electrocatalyst precursors are provided and the electrocatalyst is formed in situ as discussed above. This is a significant advantage of the present invention as it permits much greater control of the electrocatalyst properties such as composition and morphology, allowing tuning and optimisation of electrochemical performance.

The electrocatalyst is typically provided in the electrode material formulation in the form of particles. The particles typically have a primary D50 particle size in the range from about 50 nm to about 20 μm (e.g. to about 10 μm), although this is not particularly limited in the present invention. The D50 particle size may be determined by laser light scattering particle size analysis e.g. using a Malvern Instruments Ltd. Mastersizer 3000™.

Typically, the electrode material includes at least 10 wt % of electrocatalyst, e.g. at least 20 wt %, at least 30 wt % or at least 35 wt %. Typically, it includes 90 wt % or less, e.g. 85 wt % or less. In some embodiments (e.g. those including a high level of glass frit), the electrode material may include 80 wt % or less, 70 wt % or less, 60 wt % or less, 50 wt % or less or 40 wt % or less of electrocatalyst.

The content of electrocatalyst in the electrode material may be assumed to be equal to the content of electrocatalyst in the solid portion of the electrode formulation used to prepare the electrode material. The loading of electrocatalyst on the electrode is typically at least 0.1 mg/cm$^2$. It may be at least 0.2, 0.3, 0.4 or 0.5 mg/cm$^2$. In some embodiments it may be preferred that the loading of electrocatalyst on the electrode is typically at least 0.6, 0.7, 0.8, 0.9 or 1 mg/cm$^2$. There is no particular upper limit on the electrocatalyst loading, but it may be 20 mg/cm$^2$ or less, e.g. 10 mg/cm$^2$ or less, 5 mg/cm$^2$ or less, or 3 mg/cm$^2$ or less.

The loading of electrocatalyst can be determined by X-Ray fluorescence spectroscopy (XRF), which the skilled person will be familiar with. As the skilled person will understand, XRF is concerned with the emission of characteristic secondary fluorescent X-rays from a material that has been bombarded with high energy X-rays. Each element has a characteristic energy for its fluorescent rays. For a given element, the intensity of the X-ray signal at the characteristic energy for that element allows quantitative determination of the amount of that element present, by comparison to known standards. A suitable piece of equipment for XRF is a Fischerscope® X-ray XDV®-SDD instrument. Catalyst loading can be determined quantitatively using the standardless fundamental parameter (FP) method contained within the instrument software. The intensity of exciting X-rays used can enable signal to be recorded from the whole thickness of the layer of electrode material and from the substrate.

As discussed above, typically the electrocatalyst forms an interconnected network of electrocatalyst through the electrode material. In other words, the electrocatalyst percolates throughout the electrode material. Typically, the interconnected network of electrocatalyst extends from the electrolyte-side surface of the electrode material layer to the interface between the substrate and the electrode material. This is important for providing an electrical connection from the electrolyte to the substrate in use. The interconnected network may arise simply from physical contact between particles of electrocatalyst in the electrode material, or may arise from fusing or sintering of the electrocatalyst material during the electrode manufacture (e.g. during the firing step).

The chemical nature of the glass is not particularly limited in the present invention. Without wishing to be bound by theory, the present inventors believe that typically it is preferred that the glass does not react substantially with the electrocatalyst under the conditions employed in the manufacture or use of the electrode. Typically, it is preferred that the glass is substantially insoluble in the electrolyte (e.g. in salt water). Preferably, the glass itself substantially does not dissolve in the electrolyte, and preferably there is very little leaching of constituents of the glass into the electrolyte.

It may be preferred that the glass does not include components which are considered to be toxic. For example, it may be preferred that the glass is substantially free of lead. For example, it may be preferred that the glass is substantially free of chromium. This may be particularly preferred when the electrochemical cell is for use in water purification or disinfection (e.g. by electrochlorination).

As used herein, the term "substantially free of X" is intended to include glasses which contain no intentionally added X (e.g. lead or chromium). For example, the glass may include less than 0.1 wt % X, for example less than 0.05 wt %, less than 0.01 wt % or less than 0.005 wt % X.

The glass system employed in the present invention is not particularly limited. The glass system may be based on silicate glasses (in which silicon dioxide is the glass former present) or borosilicate glasses (in which silicon dioxide and boron trioxide are the glass formers present) which are resistant to chemical corrosion. Preferably, the glass comprises at least 30 wt % silicon dioxide, more preferably at least 40 wt %, even more preferably at least 50 wt %. The glass composition may comprise any appropriate combination of metal oxides. Typical oxides may, for example, be selected from the oxides of zinc, lead, bismuth, silicon, titanium, zirconium, sodium, boron, lithium, potassium, calcium, aluminium, tin, magnesium, phosphorus, cerium, strontium. The glass may optionally include oxides of transition metals such as copper, cobalt, manganese, vanadium, niobium, chromium, molybdenum, and iron. The glasses may contain fluoride to optimise flow properties.

In addition to pure frit/frit mixtures the electrode material/electrode formulation may optionally include a filler. The filler is preferably at least one member selected from silica, alumina, zirconia, zirconium silicate, cordierite, zinc silicate and often the filler is chosen to be a material suitable for tailoring the thermal expansion of the glass to closely match that of the substrate. Filler is optionally added in an amount from 0-40 vol % based on the glass material.

As demonstrated in the Examples below, in some embodiments it is preferred that the glass has acid resistant properties. This may be particularly preferred when the electrode is an anode. Preferably, the glass (in the form of glass frit e.g. as used to fabricate the electrode) has an acid resistance wherein on exposure to 1M HCl for 12 hours (e.g. at 25° C.), the frit loses less than 50% of its mass, preferably, less than 25% of its mass, less than 20% of its mass, less than 15% of its mass, less than 10% of its mass, or less than 5% of its mass. This can be determined by the acid resistance test described in the Examples below.

The particles of glass frit typically have a primary D50 particle size in the range from about 50 nm to about 20 μm (e.g. to about 10 μm), although this is not particularly limited in the present invention. The D50 particle size may be determined by laser light scattering particle size analysis e.g. using a Malvern Instruments Ltd. Mastersizer 3000™.

In some embodiments it may be preferred that the glass is alkali resistant, for example when used as a cathode electrode.

Preferably, the glass has a coefficient of thermal expansion (CTE) which is matched to that of the substrate. For example, for titanium substrates the preferred CTE of the glass is in the range from $70 \times 10^{-7}/° C.$ to $100 \times 10^{-7}/° C.$, e.g. from $80 \times 10^{-7}/° C.$ to $90 \times 10^{-7}/° C.$. Typically, the CTE of the glass differs from the CTE of the substrate by +/−20% or less, e.g. by +/−10% or less.

Typically, the electrode material includes at least 10 wt % of glass, e.g. at least 15 wt % or at least 20 wt %. In some embodiments, it may be preferred that the electrode material includes at least 30 wt %, at least 35 wt %, at least 40 wt % or at least 50 wt % of glass. Typically, the electrode material includes 90 wt % or less, 80 wt % or less, 70 wt % or less or 65 wt % or less of glass. In some embodiments, the electrode material may include 60 wt % or less, 55 wt % or less, or 50 wt % or less of glass. The content of glass in the electrode material may be assumed to be equal to the content of glass frit in the solid portion of the electrode formulation used to prepare the electrode material.

In the method of making an electrode for an electrochemical cell of the present invention, an electrode formulation comprising electrocatalyst and glass frit is applied to a substrate. The formulation typically further comprises a medium, e.g. a liquid medium. The formulation is therefore typically in the form of a paste or ink. The nature of the medium is not particularly limited. For example, it may be an aqueous or organic medium. The medium is typically selected in order to provide suitable dispersion and thixotropic properties depending on the way in which the electrode formulation is to be applied to the substrate. For example, the skilled person is aware of suitable media for printing (e.g. screen printing) of pastes and inks. The electrode formulation may include additives such as binders, dispersants and rheology modifiers.

The way in which the formulation is applied to the substrate is not particularly limited in the present invention. For example, it may be applied to the substrate by printing, e.g. screen printing (including rotary screen printing) or inkjet printing. Screen printing may be particularly preferred since it can reliably provide electrode layers of uniform thickness and defined geometry. Other suitable methods include bar coating, slot die coating, gravure coating, spraying, painting, bar coating, pad coating, gap coating techniques such as knife or doctor blade over roll, and metering rod application.

The electrode formulation may be applied in one, two or more layers on the substrate, in order to provide the desired thickness of electrode material, the desired electrocatalyst loading and/or the desired glass loading. It may be advantageous to dry each layer before the next layer is applied. Typically, 40 or fewer, e.g. 20 or fewer, or 10 or fewer layers are applied.

The electrochemical cell typically comprises an anode and a cathode. It also typically comprises an electrolyte or an electrolyte receiving zone, which may e.g. be a chamber for holding electrolyte or a flow path along which electrolyte may be caused to flow. The electrochemical cell may be an electrochlorination cell.

Examples

Frit 1

Electrode Formulation Paste

Frit 1 is a borosilicate glass with a composition shown in Table 1 below:

TABLE 1

| Theoretical Composition (mol %) of Frit 1 | |
|---|---|
| Metal oxide | Mol % |
| $SiO_2$ | 53.82 |
| $Li_2O$ | 6.74 |
| $B_2O_3$ | 13.67 |
| $TiO_2$ | 4.63 |
| $Na_2O$ | 10.92 |
| ZnO | 5.38 |
| F | 1.9 |
| $ZrO_2$ | 1.25 |
| CaO | 1.05 |
| $V_2O_5$ | 0.46 |
| $Ce_2O_3$ | 0.17 |

The theoretical composition of the glass is the composition (on an oxide basis) calculated based on the starting materials used to prepare the glass.

The glass has a CTE which is closely matched to that of the titanium metal used as the substrate ($82\text{-}87 \times 10^{-7}/° C.$) as this helps to prevent thermally induced stresses during heating and cooling during the firing process that could lead to cracking of the electrode material layer.

The electrode formulation paste was prepared by mixing $RuO_2$ with Frit 1 and suspending the mixture in organic medium. The medium used was 733-63 medium, which can be obtained from Zimmer & Schwarz, Germany. The mixture was then mixed using zirconia milling beads in a Synergy Devices Ltd. Speedmixer™ to form an ink suitable for coating.

TABLE 2

| Particle size of $RuO_2$ | |
|---|---|
| Percentile | $RuO_2$ |
| D10 | 2.49 μm |
| D50 | 6.12 μm |
| D90 | 11.6 μm |

TABLE 3

| Particle size of frit 1 | |
| --- | --- |
| Percentile | Frit 1 |
| D10 | 1.26 μm |
| D50 | 6.75 μm |
| D90 | 12.70 μm |

Titanium Plate Preparation

Each titanium substrate (25 mm×25 mm×1 mm thick, Grade 1, titanium plate) was first grit blasted to form a roughened surface to improve adhesion of the electrode material to the substrate. The surface was then acid etched in 6M HCl at 90° C. for 5 minutes, in order to remove the titanium oxide coating and metal fines generated during the grit blasting process. Once removed from the acid, the plate was blotted with absorbent paper to remove excess acid and then coated immediately.

Coating Technique

Screen printing was used to coat the prepared titanium plate with the electrode material paste to give a uniform coating. The printed electrode was allowed to dry on a hotplate at 100° C. The coating procedure was repeated until the desired coating loading was reached. The dried electrode was then fired in a furnace at the times and temperatures reported below. The temperatures reported here are the furnace temperatures, however due to the small size of the electrodes and the high thermal conductivity of the titanium substrate, it is assumed that the temperature of the glass was substantially equal to the temperature of the furnace.

Electrodes Tested 23 different electrode coatings were tested. These electrodes varied in glass frit ratio, ruthenium loading, sintering time and sintering temperature. Three different electrode pastes were prepared with the formulation reported in Table 4 below:

TABLE 4

| Paste Formulations | | | | |
| --- | --- | --- | --- | --- |
| Paste | Frit 1 (g) | RuO$_2$ (g) | Medium (g) | Frit (wt %) |
| 1 | 0.2 | 0.8 | 2.13 | 20 |
| 2 | 0.4 | 0.6 | 2.13 | 40 |
| 3 | 0.6 | 0.4 | 2.13 | 60 |

The frit wt % relates to the glass content of the solids portion of the paste.

Table 5 below shows details of the electrodes prepared using pastes 1, 2 and 3. The electrodes were prepared using the titanium plate preparation method and the coating technique described above.

TABLE 5

| Electrode Preparation | | | | | | | |
| --- | --- | --- | --- | --- | --- | --- | --- |
| Example | Paste | Target Ru loading (mg/cm$^2$) | Firing time (min) | Oven Firing temp (° C.) | No. of coats | Measured Ru loading (mg/cm$^2$) | Glass loading (mg/cm$^2$) |
| 1 | 1 | 0.5 | 5 | 650 | 1 | 0.426 | 0.140 |
| 2 | 1 | 0.5 | 30 | 750 | 1 | 0.406 | 0.135 |
| 3 | 1 | 0.5 | 5 | 850 | 1 | 0.423 | 0.139 |
| 4 | 1 | 1.25 | 17.5 | 750 | 3 | 1.246 | 0.410 |
| 5 | 1 | 2 | 30 | 650 | 4 | 1.876 | 0.617 |
| 6 | 1 | 2 | 5 | 750 | 4 | 1.970 | 0.648 |
| 7 | 1 | 2 | 30 | 850 | 4 | 1.973 | 0.649 |
| 8 | 2 | 0.5 | 17.5 | 750 | 2 | 0.587 | 0.515 |
| 9 | 2 | 1.25 | 17.5 | 650 | 4 | 1.329 | 1.167 |
| 10 | 2 | 1.25 | 30 | 750 | 4 | 1.336 | 1.173 |
| 11 | 2 | 1.25 | 5 | 750 | 4 | 1.390 | 1.220 |
| 12 | 2 | 1.25 | 17.5 | 850 | 4 | 1.276 | 1.120 |
| 13 | 2 | 2 | 17.5 | 714 | 7 | 2.250 | 1.975 |
| 14 | 2 | 2 | 17.5 | 850 | 7 | 2.275 | 1.997 |
| 15 | 3 | 0.5 | 30 | 650 | 2 | 0.428 | 0.845 |
| 16 | 3 | 0.5 | 5 | 750 | 2 | 0.410 | 0.810 |
| 17 | 3 | 0.5 | 60 | 1000 | 2 | 0.413 | 0.816 |
| 18 | 3 | 1.25 | 17.5 | 750 | 6 | 1.433 | 2.830 |
| 19 | 3 | 2 | 5 | 650 | 9 | 2.258 | 4.459 |
| 20 | 3 | 2 | 30 | 750 | 9 | 1.942 | 3.835 |
| 21 | 3 | 2 | 5 | 850 | 9 | 2.252 | 4.448 |
| 22 | 3 | 1.25 | 60 | 750 | 6 | 1.384 | 2.733 |
| 23 | 3 | 1.25 | 120 | 750 | 6 | 1.348 | 2.662 |

The Ru loading (mg/cm$^2$) was determined using X-ray fluorescence. The glass loading was calculated from the measured Ru loading and the glass:RuO$_2$ ratio.

Electrochemical Flow Cell

The flow cell used in test experiments was a three electrode electrochemical cell containing a working electrode (test anode), a counter electrode (platinum coated titanium plate cathode) and a Ag/AgCl reference electrode. Aqueous NaCl electrolyte was flowed into the cell, between the working and counter electrodes and across the reference electrode, and then out of the cell.

Electrode Stress Testing

The electrodes listed above were tested in the flow cell under the following conditions.
1. Electrolyte NaCl (28 g/L)
2. Flow rate of 30 ml/min
3. Electrode spacing 1 mm (working to counter electrode)
4. Constant current density of 200 mA/cm$^2$.

The stress test reversed the voltage polarity across the electrodes every 60 seconds. On voltage reversal the anode electrode then became a cathode and supported the hydrogen evolution reaction, which evolves hydrogen gas bubbles and leads to a rise in pH in the electrolyte near the electrode surface. The voltage reversal stress test rapidly ages the electrode surface and can lead to dissolution or disintegration of susceptible electrode materials.

Figure 3:
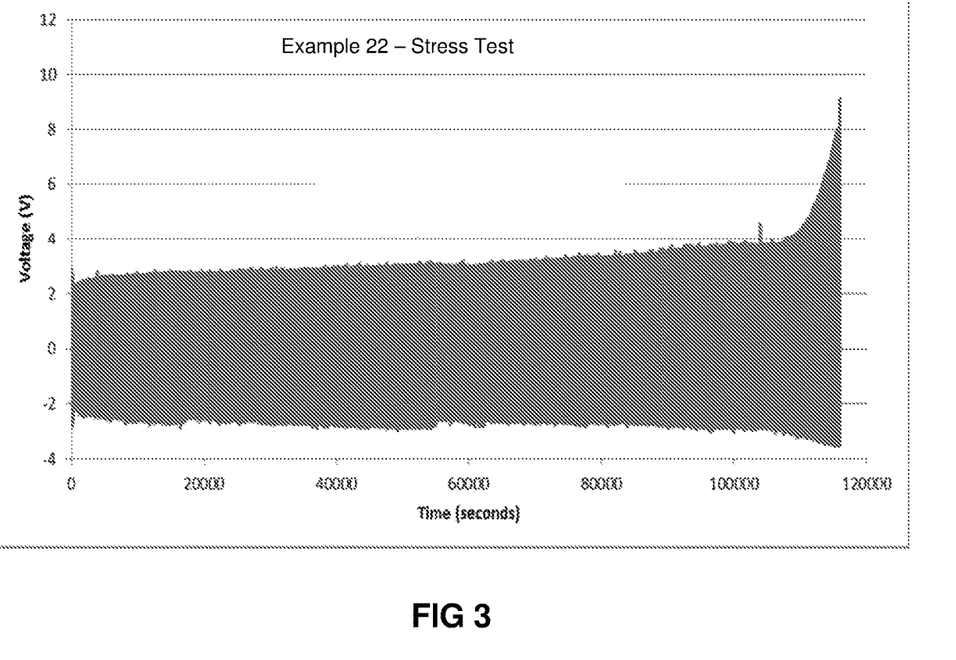
FIG. 3 shows the voltage-time trace for the electrode of Example 22 in the stress test reported in the Examples.

An example stress test chart is shown in FIG. 3 (this figure shows the results for Example 22). The electrode is considered to no longer be usable once the voltage exceeds 5V (at approximately 32 hours for the electrode in FIG. 3). The target time to 5V is 5 hours or more to provide an acceptable level of durability. The results for the electrodes specified in Table 5 above are shown in Table 6 below.

TABLE 6

Stress Test Results

| Example | Paste | Run time to 5 V (hours) | Running Voltage (V) |
|---|---|---|---|
| 1 | 1 | 1.9 | 2.8 |
| 2 | 1 | 0.0 | 5.5 |
| 3 | 1 | 0.0 | 9.0 |
| 4 | 1 | 8.3 | 3.8 |
| 5 | 1 | 4.8 | 3.0 |
| 6 | 1 | 11.3 | 3.5 |
| 7 | 1 | 0.0 | 6.0 |
| 8 | 2 | 19.4 | 3.9 |
| 9 | 2 | 6.8 | 2.1 |
| 10 | 2 | 20.2 | 3.5 |
| 11 | 2 | 14.1 | 2.2 |
| 12 | 2 | 0.0 | 6.2 |
| 13 | 2 | 12.3 | 2.4 |
| 14 | 2 | 0.0 | 6.2 |
| 15 | 3 | 5.7 | 2.2 |
| 16 | 3 | 15.0 | 2.4 |
| 17 | 3 | 0.0 | 9.0 |
| 18 | 3 | 21.4 | 2.0 |
| 19 | 3 | 5.3 | 1.7 |
| 20 | 3 | 22.3 | 2.2 |
| 21 | 3 | 0.0 | 0.0 |
| 22 | 3 | 32.0 | 2.7 |
| 23 | 3 | 28.9 | 3.0 |

For Examples 1, 2 and 3, it is believed that the low durability results from a very low thickness layer with insufficient glass loading, since the paste had a low glass content and only a single layer of paste was applied. This meant that the electrode layer did not form a barrier between the electrolyte and the substrate. In Example 3, there was also significant thermal oxidation of the substrate due to the high firing temperature.

The relatively lower (but still acceptable) durability observed in Examples 5, 9 and 19 is believed to result from a lower degree of coalescence of the glass frit compared with the Examples which were fired at a higher temperature, and/or due to some contact between the electrolyte and the titanium substrate.

The poor results in Examples 7, 12, 14, 17 and 21 are believed to result from a reduction in activity of the electrode, resulting from firing the glass frit at too high a temperature. This may be due to encapsulation of the electrocatalyst by the glass and/or oxidation of the substrate as discussed hereinbefore.

The results reported in Table 4 demonstrate that addition of up to 60 wt % of glass frit did not inhibit the activity of the electrode. The preferred firing temperature for this type of glass appears to be approximately 750° C., which is about 50° C. above the temperature at which the glass begins to exhibit macroscopic glass flow (see FIG. 1).

From the results of the experiment set it can be seen that better durability is achieved using Examples 18, 20, 22 and 23, using 60% wt frit and 750° C. firing temperature. In Example 22 in Table 4 the firing time was increased to 1 hour at 750° C., which increased the durability test time to 32 hrs. The voltage trace for Example 22 is shown in FIG. 3.

Frit 2

During normal running conditions of an electrochlorination cell, the environment at the anode becomes acidic as described above, due to the evolution of oxygen for example, and additionally due to the following equilibrium reactions of chlorine:

Therefore, the present inventors have tried using a frit with acid resistant properties in the electrodes. Frit 2 is an acid resistant silica and zirconia based frit with the composition given in Table 7 below:

TABLE 7

Theoretical Composition (mol %) of Frit 2

| Metal oxide | Frit 2 (mol %) |
|---|---|
| $SiO_2$ | 66.12 |
| $Li_2O$ | 4.55 |
| $Na_2O$ | 12.86 |
| $ZrO_2$ | 6.64 |
| CaO | 4.71 |
| SrO | 2.58 |
| $Al_2O_3$ | 1.31 |
| MgO | 0.36 |

Figure 4:
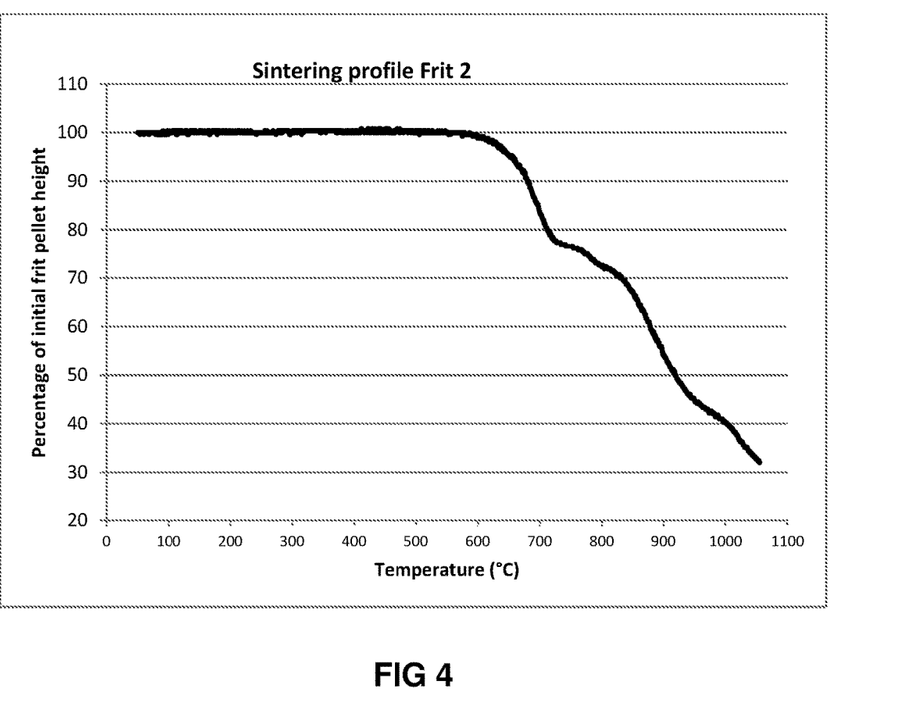
FIG. 4 shows a profile of Frit 2 taken from a hot stage microscope experiment as reported in the Examples.

The profile of Frit 2 in a hot stage microscopy test is shown in FIG. 4.

The particle size distribution (determined by light scattering particle sizing) is given in Table 8 below:

TABLE 8

Particle size of Frit 2

| Surface area | Frit 2 |
|---|---|
| D10 | 1.46 µm |
| D50 | 6.29 µm |
| D90 | 20.2 µm |

Electrodes were made using the method described above for electrodes comprising Frit 1. The electrodes were tested using the same electrode stress test. Two electrodes were tested, both using a paste with an analogous formulation to Paste 3 above, except that Frit 1 was replaced by Frit 2.

TABLE 9

Electrode Preparation (Frit 2)

| Example | Target Ru loading (mg/cm²) | Firing time (min) | Oven Firing temp (° C.) | No. of coats | Measured Ru loading (mg/cm²) |
|---|---|---|---|---|---|
| 24 | 1.25 | 30 | 800 | 7 | 1.578 |
| 25 | 1.25 | 120 | 800 | 6 | 1.291 |

TABLE 10

Stress Test Results (Frit 2)

| Example | Run time to 5 V (hours) | Running Voltage (V) |
|---|---|---|
| 24 | 53.5 | 3.7 |
| 25 | 52 | 3 |

FIG. 5 shows a backscattered SEM image of the electrode made for Example 24. The image shows an interconnected network of electrocatalyst throughout the layer of electrode material.

Acid Resistance Test

To test acid resistance of the frit a 2.0 g sample of Frit 1 was stirred in deionised water as a reference test, and another 2.0 g sample was stirred in 1M HCl for 12 hrs. Both frit suspensions were isolated by centrifuge and dried to determine weight loss. The water washed sample had a negligible loss whereas the acid washed sample lost 0.87 g by weight (44% loss).

Testing Frit 2 using the same procedure also resulted in a negligible loss in deionised water and the acid washing treatment only resulted in a 0.2 g weight loss (2% loss).

Variation of Electrode Preparation Conditions and Performance Testing Frit 2 (60% Wt Frit)

The electrode formulation paste was prepared by mixing $RuO_2$ with Frit 2 and suspending the mixture in 733-63 medium in the ratio 0.4:0.6:0.8 ($RuO_2$:Frit 2:733-63). The mixture was then mixed in a Synergy Devices Ltd. Speed-mixer™ to form an ink suitable for coating.

Titanium substrates (grade 1, 1 mm thick) were first grit blasted and then sonicated in ultra-pure water (10 mins) followed by 10 wt. % sodium hydroxide (10 mins). Once sonicated, the electrodes were acid etched in 6 M HCl at 80° for 5 minutes, then immediately the ink containing glass frit and catalyst was screen printed onto the substrates to produce a target ruthenium oxide loading of 1.2 mg cm$^{-2}$ with 2 coats. After the first coat the electrodes were dried for 5 minutes in an oven at 140° C. and after the second coat the electrodes were dried in the oven at 140° C. for a further 40 minutes.

The electrodes were then fired in air using a tube furnace at an oven temperature (Oven T) for t mins. The peak temperature of the electrode (Tpeak) and amount of time that the electrode is over 500° C. (t (>5000)) during the firing step were also recorded (see Table 11). Electrodes were tested for degradation applying a galvanostatic square wave (reverse polarisation every 1 minute between ±200 mA cm$^{-2}_{Geo}$ using a Biologic VSP potentiostat). The running voltage at 1 h, running time to 3V (hours) and running time to 5V (hours) were recorded (Table 11).

region for Frit 2, i.e. the transition from sintering to macroscopic flow (see FIG. 4).

REFERENCES

1. S. Trasatti, Electrocatalysis: understanding the success of DSA, Electrochimica Acta 45 (2000) 2377-2385
2. Chandler et al., Electrodes based on noble metals, Platinum Metals Rev., 1997, 41, (2), 54-63
3. Song et al., Effect of glass frit addition on corrosion resistance of Ti/$TiO_2$/$IrO_2$—$RuO_2$ films, Materials Letters 58 (2004) 817-823

The invention claimed is:

1. An electrode for an electrochemical cell, the electrode comprising:
    a porous electrode material disposed on a substrate;
    wherein the electrode material comprises an electrocatalyst and a solid glass phase which binds the electrocatalyst to the substrate;
    wherein the electrocatalyst forms an interconnected network of electrocatalyst through the porous electrode material;
    wherein the solid glass phase is a sintered glass frit which constitutes at least 50 wt % of the electrode material;
    wherein the solid glass phase is substantially free of lead; and
    wherein the loading of solid glass phase on the electrode is from 0.2 mg/cm$^2$ to 20 mg/cm$^2$, and
    wherein the electrode material comprises exposed electrocatalyst.

2. The electrode according to claim 1 wherein the solid glass phase is a silicate or borosilicate glass phase.

3. The electrode according to claim 1, wherein the electrode material forms a barrier on the surface of the substrate, thereby preventing contact between the electrolyte and the substrate in use.

4. The electrode according to claim 1 wherein the electrocatalyst is an oxygen evolution reaction (OER) catalyst, an oxygen reduction reaction (ORR) catalyst, a hydrogen evolution reaction (HER) catalyst and/or an electrochlorination catalyst.

TABLE 11

Preparation conditions and Stress Test Results (Frit 2)

| Example | Oven T/ ° C. | t/mins | T (peak)/ ° C. | t (>500° C.)/ mins | E (1 hour)/V | t (3 V)/h | t (5 V)/h |
|---|---|---|---|---|---|---|---|
| 26 | 800 | 5 | 647 | 3.7 | 2.3 | 3.5 | 3.7 |
| 27 | 800 | 7 | 690 | 5.7 | 1.7 | 12.8 | 14.9 |
| 28 | 800 | 9 | 707 | 8.3 | 2.2 | 22.8 | Not measured |
| 29 | 800 | 11 | 725 | 10.7 | 1.8 | 21.8 | Not measured |
| 30 | 800 | 13 | 729 | 13 | 1.7 | 36.7 | 47 |
| 31 | 850 | 7 | 760 | 7 | 1.9 | 48 | Not measured |
| 32 | 800 | 13 | 675 | 12 | 1.7 | 21.6 | 23.6 |
| 33 | 800 | 13 | 671 | 12 | 1.8 | 20.7 | 23.9 |
| 34 | 800 | 15 | 713 | 14.7 | 2.3 | 31.1 | 44 |
| 35 | 850 | 10 | 768 | 10 | 2 | 22.6 | Not measured |
| 36 | 900 | 7 | 802 | 7.7 | 2.4 | 3 | 9.8 |

The electrode formed in Example 26 had surface coating on the substrate which was easily rubbed off as a powder indicating that a solid glass phase had not formed due to the low T(peak). This electrode showed poor durability during performance testing. In each of the other examples, the electrodes meet the durability requirements. The preferred firing temperature (T(peak)) for this type of glass appears to be approximately 700° C. to 760°, which is in the Zone 3

5. The electrode according to claim 1 wherein the solid glass phase is acid resistant.

6. The electrode according to claim 1 wherein the electrode material has pores and/or pits on an electrolyte-side surface thereof.

7. The electrode according to claim 1 wherein the coefficient of thermal expansion (CTE) of the solid glass phase differs from the coefficient of thermal expansion (CTE) of the substrate by +/−10% or less.

8. A method of making an electrode for an electrochemical cell comprising applying an electrode formulation comprising electrocatalyst and glass frit to a substrate and firing the electrode formulation so as to give rise to an electrode according to claim 1.

9. The method according to claim 8 wherein the electrode formulation includes at least 10 wt % of the glass frit.

10. The method according to claim 8 wherein the glass frit is a silicate or a borosilicate glass.

11. The method according to claim 8 wherein the glass frit is substantially free of lead.

12. The method according to claim 8 wherein the method includes 3 firing steps or fewer, preferably a single firing step.

13. The method according to claim 8 wherein the electrode formulation is applied to the substrate by printing one or more layers of electrode formulation onto the substrate, preferably by screen printing.

14. The method according to claim 8 wherein the firing step comprises heating to a temperature of not more than 120° C. in excess of the temperature at which the glass begins to exhibit macroscopic glass flow.

15. An electrochemical cell comprising an electrode as defined in claim 1.

16. The electrochemical cell according to claim 15 which is an electrochlorination cell.

17. An electrochemical cell, the electrochemical cell comprising an electrode made according to claim 8.

* * * * *